United States Patent

[15] 3,707,232

Harrington et al.

[45] Dec. 26, 1972

[54] SKIMMERS FOR POLLUTION CONTROL DEVICE

[72] Inventors: John W. Harrington, 7123 Merrimac Drive; Edward G. Milne, 7115 Merrimac Drive, both of McClean, Va. 22101

[22] Filed: Oct. 20, 1970

[21] Appl. No.: 82,526

[52] U.S. Cl............................210/242, 210/DIG. 21
[51] Int. Cl...............................................C02b 9/02
[58] Field of Search..................210/83, 242, DIG. 21

[56]  References Cited

UNITED STATES PATENTS

| | | | |
|---|---|---|---|
| 1,955,308 | 4/1934 | Naftel et al. | 210/242 |
| 3,534,858 | 10/1970 | Harrington | 210/242 |
| 3,565,254 | 9/1969 | Latimer | 210/242 |

Primary Examiner—Samih N. Zaharna
Assistant Examiner—T. A. Granger
Attorney—William D. Stokes

[57]  ABSTRACT

Floating skimmers slidable on an intake conduit having means counteracting the internal pressure drop normally incident to the intake operation. In one embodiment, the cone member has upper vent openings and an internal cylindrical part around the conduit and depending down to near the bottom of the cone. In a second embodiment, the upper cone member is connected pneumatically to the internal chamber of a bellows and the moveable part of the bellows is connected structurally to the cone. In both embodiments, the upper cone has a horizontal flange and the lower float has a flat surface extending slightly past the flange and positioned close to the flange in normal use.

11 Claims, 2 Drawing Figures

PATENTED DEC 26 1972 3,707,232

INVENTORS
JOHN W. HARRINGTON,
EDWARD G. MILNE

BY
William D. Stokes
ATTORNEY

SKIMMERS FOR POLLUTION CONTROL DEVICE

This invention is concerned with apparatus for removing pollutants floating on a body of liquids; specifically with slidably mounted floating skimmers for such apparatus. In preferred forms, this invention comprises improved skimmers for the apparatus described in application Ser. No. 733,438, filed May 31, 1968, now U.S. Pat. No. 3,534,858, entitled Pollution Control Device, by John W. Harrington, who is an inventor of this application.

Under certain operating conditions of the device described in that application, the cone, the upper floating member, performed deficiently in that it did not float as high as would be satisfactory. In accordance with this invention, the reason for such deficient performance is defined as not one of weight or balance, but rather an effect of the pressure differential between the outside of the cone and the inside of it. Further, in accordance with this invention, means are provided to negate this differential to allow the cone freedom of movement to achieve adjustment and freer float on the pollutant surface under all operating conditions.

No specifically similar or closely pertinent skimmers or the like are known to exist in the prior art.

It is an object of this invention to provide a floating skimmer which performs well under various normal operating conditions.

It is a further object of this invention to provide a floating skimmer which resists the adverse effects of pressure differentials created as an incident of operation.

It is another, more general object of this invention to provide a floating skimmer which automatically overcomes the effects of reduced pressures caused by the intake of material by the skimmer.

In accordance with this invention, a floating skimmer with a top, floatable member slidable on an intake conduit and a bottom, floatable member is provided with means to counteract the internal pressure drop normally incident to the intake operation. In one preferred form, the upper member has upper vent openings and a depending part near the conduit to confine the intake to the bottom of the conduit. In a second preferred form, the upper cone member is connected pneumatically to the chamber of a bellows and a moveable part of the bellows is connected structurally to the upper member. Further improvement is achieved from use of an upper member terminating in a horizontal flange and a lower member including a grossly flat (preferably slightly concave in some forms) part beneath the flange extending to the same general outer locations as the flange and positioned close to the flange in normal use.

These and other objects, features, advantages and characteristics of the invention will be apparent from the following description of preferred embodiments, as illustrated by the accompanying drawings in which.

FIG. 1 EMBODIMENT

Figure 1:
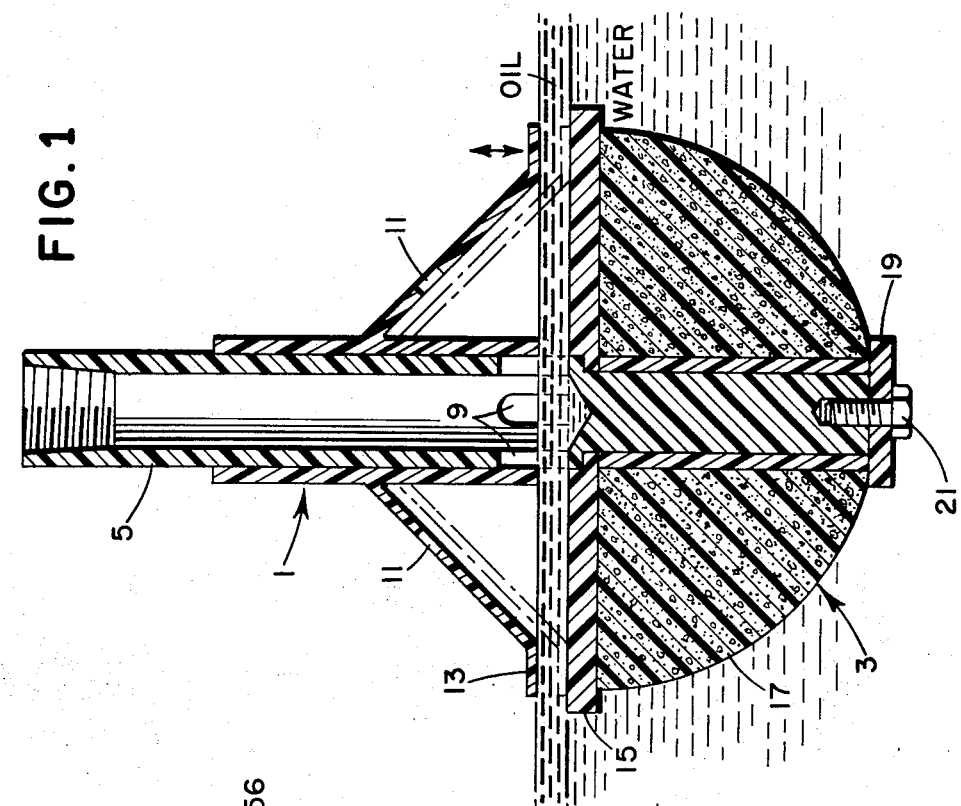
FIG. 1 is a sectional view of a first preferred embodiment of a skimmer.

As in the previously cited application Ser. No. 733,438, two basic elements of the skimmer are top floating member 1 and a bottom floating member 3, connected to a pipe or conduit 5.

Top member 1 is cone shaped in external configuration and hollow with a depending cylindrical part 7 mounted on pipe 5 for slidable movement as part of member 1 under the buoyant action of the fluid in which it is immersed. Cylindrical part 7 covers intake ports 9, so that only the areas past the bottom of part 7 are operative. Vent holes 11 communicate to the atmosphere at points on the upper part of member 1. The lower, external edge of top member 1 is terminated by a horizontal flange 13.

The bottom floating member 3 is generally semi-spherical, made up of a top, generally flat plate 15, having an opening received in an extension of pipe 5. Under plate 15 is a hemisphere 17 receiving and fitting closely around the extension of pipe 5. A washer 19 is positioned under the assembly, and the entire assembly is held together by screw 21, threaded into the end of the solid bottom of an extension of pipe 5. Stops may be added on any point of proximity between top member 1 and plate 15 to maintain a minimum skimming aperture between the top member 1 and the bottom member 3.

Floatable top member 1 and hemispherical floatable member 3 are designed and constructed in such manner and of such material that the bottom edge 15 of member 1 will float on the surface or just within the upper surface of the lighter liquid, e.g., oil, to be removed, while member 3 floats partially in the heavier liquid, to the end that a suction aperture is formed between the lower edge of top member 1 and the top part of plate 15 of member 3.

The top part of plate 15 may be entirely flat, but it is preferred in this embodiment that it be moderately concave, so as to act somewhat as a small basin. The member 3 is constructed and adapted so that during normal use the upper surface of plate 15 is at or just under the pollutant-water interface. Plate 15 extends to and preferably somewhat past the flange 13 on top member 1. It has been found that this relationship tends to direct the intake in a manner resisting reduction in internal pressure within top member 1, with attendant increased retrieval volume and improved flow.

Top member 1 being slidably mounted on pipe 5 will allow the aperture for intake between members 1 and 3 to automatically adjust itself to the thickness of the floating pollutant. It is to be understood that the configuration described may be greatly varied and still fall within the inventive concept.

The connection of the upper part of pipe 5 to conduit and vacuum pump means may be substantially identical with that described in the above cited application. Thus, the upper part of the pipe 5 is threaded (internally or externally) and a swivel joint (not shown) is threaded thereon. The swivel joint is connected through flexible hose (not shown) to a pump and other equipment, usually located on a ship. A plurality of such assemblies may be mounted together on a separate frame for sweep operations as a unit.

In operation, the device functions automatically to provide good intake of pollutants while minimizing effects of differential pressure. Top member 1 floats away from proximity with the plate 15 in accordance with the thickness of pollutant. Cylindrical part 7 moves upward to open the bottom parts of ports 9. Flow of the intake is generally planar, across plate 15.

Vent holes 11 communicate with the atmosphere. Significant reduction in internal pressure is not experienced during normal operation, including conditions of large intake.

FIG. 2 EMBODIMENT

Figure 2:
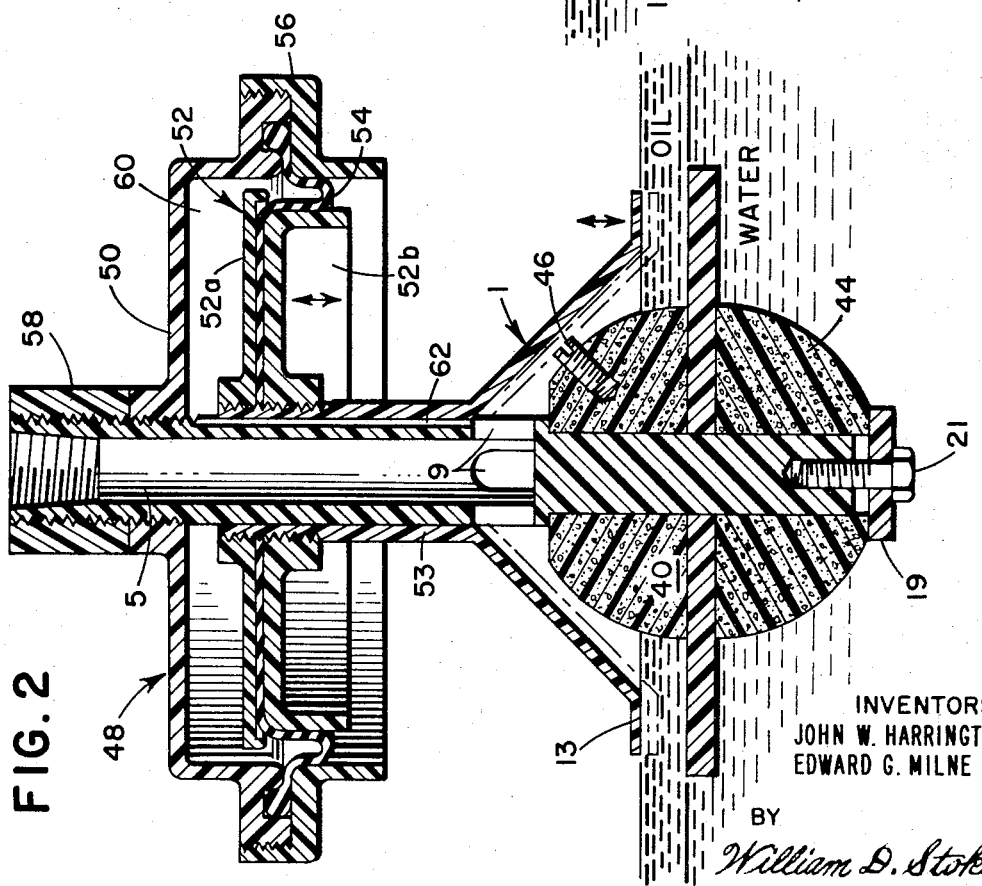
FIG. 2 is a section view of a second preferred embodiment of a skimmer.

Although the embodiment of FIG. 1 is considered preferable in general, the embodiment of FIG. 2 is a valuable alternative and provides the advantage of positive control.

Much regarding this embodiment does not differ from that of the FIG. 1 embodiment. Description of such matter will not be repeated and closely corresponding parts are given the same numerals.

The intake parts 9 in this embodiment are located above a spherical, bottom float member 3, made up of a top hemisphere 40, having an internal opening received in an extension of pipe 5. Under hemisphere 40 is a flat plate 42, having an opening receiving and fitting closely around the extension of pipe 5. Under plate 42 is a bottom hemisphere 44, similarly fit on pipe 5. Plate 42 has a part extending circumferentially past the hemispheres 40 and 44. A washer 19 is positioned under the assembly, and the entire assembly is held together by screw 21, threaded into the end of the solid bottom of an extension of pipe 5.

Stops 46 are carried on the top part of hemisphere 40, to prevent top member 1 from dropping to a point at which the intake path is completely blocked.

The member 3 is constructed and adapted so that during normal use the upper surface of the circumferential part of plate 42 is at or just under the pollutant-water interface. The circumferential part of plate 42 extends to and preferably somewhat past the flange 13 on top member 1. It has been found that this relationship tends to direct the intake in a manner resisting reduction in internal pressure within top member 1, with attendant increased retrieval volume and improved flow. In some applications, improved performance may be realized when the upper, circumferential part of plate 42 is slightly concave.

Should the layer of pollutant become negligible, the stops 46 will prevent complete closure of the nozzle. It is to be understood that the configuration described may be greatly varied and still fall within the inventive concept.

A bellows assembly 48 is threaded to pipe 5 by relatively stationary wall 50. A bottom, relatively moveable wall 52 is threaded to an upwardly extending, cylindrical part 53 of member 1 which fits closely around pipe 5. Wall 52 comprises an upper member 52a and a lower member 52b tightly holding a pliable band 54 as a diaphragm. Band 54 has a slack portion to permit motion. Band 54 extends to the side of the assembly where it is tightly wedged between stationary wall 50 and bottom frame member 56, which is threaded to the circumference of wall 50. The entire assembly is further stabilized by a nut 58 which is threaded on pipe 5 to tightly contact wall 50.

The members described define a pneumatically closed chamber 60. A narrow slot 62 passes through the vertical extension 53 and pneumatically connects chamber 60 with the internal area under member 1.

In operation, the device functions automatically to provide good intake of pollutants while minimizing effects of differential pressure. Top member 1 floats away from proximity with the circumferential part of plate 42 in accordance with the thickness of pollutant. Pneumatic connection with chamber 60 of the bellows is present through slot 62.

Decrease in pressure inside member 1 during intake is communicated through slot 52 and results in a corresponding drop of pressure within chamber 58. Outside atmospheric pressure then acts upon moveable wall 52 to force it upward, pulling upper member 1 upward with it and effectively counteracting the drop in pressure. The slack part of pliable band 54 permits the upward and downward movement of wall 52 while keeping chamber 60 closed.

It will be recognized that the embodiments disclosed may take many forms, and that variations involving basic changes may be possible which nevertheless include part or all of this invention, and that embodiments are possible which are less desirable, but which include and benefit from part or all of this invention, and that, accordingly, patent coverage should not be limited to the details described, but should be more general, as provided by law, with particular reference to the accompanying claims.

What is claimed is:

1. A float mounted pump intake for skimming liquids from the surface of a liquid body comprising:
    a. a conduit extending upwardly from the surface of said liquid body;
    b. hose means connecting an upper end of said conduit with a pump inlet;
    c. a floatable hollow member comprising a first small end surrounding said conduit and in sliding engagement with said conduit and a second large open end in sealing engagement with the surface of said liquid body, said floatable hollow member having means for counteracting reduction in the internal pressure within said floatable hollow member, incident to intake through said pump intake;
    d. inlet means to said conduit constructed and arranged interiorly of said floatable hollow member and in communication with the surface of said liquid body; and
    e. float means substantially rigidly secured to said conduit.

2. Apparatus as in claim 1 wherein said means for counteracting the internal pressure drop comprises a pneumatic path providing pneumatic communication between the internal chamber defined by said floatable hollow member and a body of air.

3. Apparatus as in claim 1 wherein said pneumatic path is an opening defined by said floatable hollow member and allows said internal chamber of said float to communicate with the outside atmosphere.

4. Apparatus as in claim 1 wherein the internal chamber defined by said hollow member communicates through said pneumatic path with an expansible air chamber which slideably adjusts the position of said hollow member in response to the pressure in said internal chamber defined by said hollow member.

5. Apparatus as in claim 4 wherein said expansible chamber comprises first and second elements, said first element secured to said conduit and said second element secured to said hollow member, said first and said second elements being operatively connected to form a chamber.

6. Apparatus as in claim 5 wherein said air chamber further comprises a pliable band which maintains the seal between said first and second elements while allowing relative movement of said first and second elements.

7. Apparatus as in claim 6 further comprising plate means secured to and disposed around said float means to define with said hollow member a path for the intake of oil.

8. Apparatus as in claim 7 further comprising a stop lodged in said float means to limit the sliding of said hollow member.

9. Apparatus as in claim 8 wherein said hollow member comprises a frusto-conical element secured to a cylindrical element and said frusto-conical element forms said second large open end.

10. Apparatus as in claim 3 further comprising plate means secured to and disposed around said float means to define with said hollow member a path for the intake of oil.

11. Apparatus as in claim 10 wherein said hollow member comprises a frusto-conical element secured to a cylindrical element and said frusto-conical element forms said second large open end.

* * * * *